(12) United States Patent
Kwon et al.

(10) Patent No.: US 7,012,347 B2
(45) Date of Patent: Mar. 14, 2006

(54) SUPERCONDUCTING ROTOR WITH COOLING SYSTEM

(75) Inventors: Young Kil Kwon, Kyungsangnam-do (KR); Myung Hwan Shon, Boosan-si (KR); Eon Young Lee, Kyungsangnam-do (KR); Seung Kyu Baik, Kyungsangnam-do (KR); Seog Whan Kim, Kyungsangnam-do (KR); Mun Soo Yun, Kyungsangnam-do (KR); Kang Sik Ryu, Kyungsangnam-do (KR)

(73) Assignee: Korea Electrotechnology Research Institute, Kyungsangnam-do (KR)

( * ) Notice: Subject to any disclaimer, the term of this patent is extended or adjusted under 35 U.S.C. 154(b) by 0 days.

(21) Appl. No.: 10/616,943

(22) Filed: Jul. 11, 2003

(65) Prior Publication Data

US 2004/0017117 A1    Jan. 29, 2004

(30) Foreign Application Priority Data

Jul. 24, 2002    (KR) ...................... 10-2002-0043454

(51) Int. Cl.
*H02K 9/00*    (2006.01)
*F16C 39/00*    (2006.01)

(52) U.S. Cl. .......................... 310/64; 505/878; 310/61; 310/52

(58) Field of Classification Search .................. 310/52, 310/55, 57, 58, 61, 64; 62/6, 434, 47.1, 51.1; 505/892, 878, 894, 877
See application file for complete search history.

(56) References Cited

U.S. PATENT DOCUMENTS

| 4,082,967 A | * | 4/1978 | Laskaris | ...................... 310/64 |
| 4,228,374 A | * | 10/1980 | Elsel | ........................... 310/53 |
| 5,482,919 A | * | 1/1996 | Joshi | ........................... 310/52 |

* cited by examiner

Primary Examiner—Tran Nguyen
(74) Attorney, Agent, or Firm—Rothwell, Figg, Earnst & Manbeck

(57) ABSTRACT

Disclosed herein is a superconducting rotor with a cooling system located inside. The rotor comprises a superconducting field coil for generating a strong magnetic field, a field coil supporting member for supporting the superconducting field coil, and a pulse tube refrigerator. The pulse tube refrigerator comprises an annular-shaped regenerating tube disposed inside the field coil supporting member and connected to a low temperature end connection part, a pulse tube disposed inside the regenerating tube and connected to the regenerating tube, a high temperature end connection part connected between the regenerating tube and the pulse tube, a working fluid flowing tube disposed at the high temperature end of the regenerating tube for allowing a high pressure gas to flow into the regenerating tube and a low pressure gas to flow out of the regenerating tube, a double gas inlet valve connected between the working fluid flowing tube and the pulse tube at the high temperature end connection part, and a gas buffer tank connected to the pulse tube at the high temperature end connection part via an orifice valve. To the field coil supporting member is connected with a torque tube for transmitting a rotating force to the outside. The pulse tube refrigerator installed inside the field coil is operated to cool the field coil to a working temperature at which the field coil is maintained at a superconducting state.

11 Claims, 3 Drawing Sheets

SUPERCONDUCTING ROTOR WITH COOLING SYSTEM

BACKGROUND OF THE INVENTION

1. Field of the Invention

The present invention relates to a superconducting rotor for generators or motors, and more particularly to a superconducting rotor with a cooling system whose field coil is in more simplified structure to be superconductive.

2. Description of the Related Art

As well known to those skilled in the art, a rotor comprising a field coil made of a superconducting wire, not a copper wire, is called a superconducting rotor, which is shown in FIG. 1.

As shown in FIG. 1, the conventional superconducting rotor comprises: a superconducting field coil 10 made of a superconducting wire for generating a strong magnetic field; a field coil supporting member 11 for supporting the superconducting field coil 10; a torque tube 12 connected to the field coil supporting member 11 for transferring a rotating force from the superconducting field coil 10 to the outside; an inner rotor cylinder 13 for enclosing at least the field coil supporting member 11 including the superconducting field coil 10; an outer rotor cylinder 14 for enclosing the inner rotor cylinder 13; a thermal radiation shield 15 mounted between the inner rotor cylinder 13 and the outer rotor cylinder 14; and a coolant supplying/receiving unit 20 for supplying a cryogenic coolant to the inner rotor cylinder 13 to cool the field coil 10 so that the field coil 10 is maintained at a superconducting state. Between the inner rotor cylinder 13 and the outer rotor cylinder 14 is defined a high vacuum layer 18 for insulating heat transferred from the outside of the rotor.

The coolant supplying/receiving unit 20 is installed to cool the field coil 10 so that the field coil 10 is maintained at a superconducting state. The coolant supplying/receiving unit 20 comprises: an inner tube (a coolant supplying tube) 21, connected to the inner rotor cylinder 13, for supplying the coolant to the interior of the inner rotor cylinder 13; and an outer tube (a gas discharging tube) 22, concentrically disposed around the inner tube 21, for discharging the evaporated gas from the inner rotor cylinder 13.

In the coolant supplying/receiving unit 20 is disposed a rotary sealing unit 30, for example, a ferro-fluid magnetic sealing device, which is operated at cryogenic temperature, for maintaining high vacuum state between the rotatable part of the rotor including the inner and outer rotor cylinders 13, 14 and the high vaccum layer 18 and the non-rotatable part, namely, a vaccum layer 28 of the coolant supplying/receiving unit 20.

A cooling mechanism for maintaining the field coil 10 at a superconducting state in the conventional superconducting rotor shown in FIG. 1 is operated as follows. A coolant 23 at cryogenic temperature stored in a gas buffer tank 25, for example, a coolant having a boiling point of 20 to 30 Kelvin, at which the field coil made of a high-temperature superconducting wire is cooled, such as liquid neon of 27 Kelvin or −246.15 ˚к, liquid hydrogen of 20 Kelvin or −253.15 ˚к, etc., is supplied to the inner rotor cylinder 13 via a coolant supplying tube 26, the rotary sealing unit 30, and the inner tube 21. The liquid coolant at the cryogenic temperature cools the superconducting field coil 10, which is thus maintained at the superconducting state. The coolant, which is evaporated as the field coil 10 is cooled, is received to a cooling zone 24 via the outer tube 22, the rotary sealing unit 30, and a coolant receiving tube 27, and then condensed at the cooling zone 24. The condensed coolant at the cryogenic temperature returns to the gas buffer tank 25, which will be used again as a coolant for the superconducting field coil.

The evaporated coolant, which is discharged as mentioned above, cools the inner rotor tube 13, the thermal radiation shield plate 15, and the torque tube 12.

The operation of the conventional superconducting rotor shown in FIG. 1 will now be briefly described. First, a coolant at cryogenic temperature is continuously supplied to the inner rotor cylinder 13 via the inner tube 21 to maintain the field coil 10 at a superconducting state. The resulting evaporated coolant is discharged via the outer tube 22. At the same time, the field coil 10 is excited by means of an external power source so that a strong magnetic field is generated. By means of the rotary magnetic field, an electric current is generated at an armature wound around the outer rotor cylinder while being spaced apart from the outer rotor cylinder (for a generator). Otherwise, an electric current may be applied to the armature so that the field coil to generate torque (for a motor).

A superconducting generator or a superconducting motor using the aforesaid conventional superconducting rotor has advantages in that its loss is reduced by more than 50% as compared with conventional normal conducting generators and motors, and that its capacity is double those of the conventional normal conducting generators and motors, assuming their sizes are the same, or its size is decreased by half compared to the conventional normal conducting generators and motors, assuming their capacities are the same, since a large amount of electric current can go through the field coil, whereby it is possible to realize a superconducting generator or a superconducting motor with large capacity and/or small-sized structure. Recently, performance of an oxide-based superconducting wire having high operating temperature has been surprisingly improved, and thus it is predicted that generators and industrial motors having small or medium capacity will be developed recently.

However, the conventional superconducting rotor as shown in FIG. 1 requires the coolant supplying/receiving unit 20 having a complicated multiple cylindrical structure to maintain the field coil 10 at a superconducting state, and a long cryogenic temperature flow channel is formed in the course of supplying/receiving/recondensing of the coolant, whereby a thermal insulating structure is excessively extended, and thus its cooling efficiency is abruptly reduced. Furthermore, the rotary sealing unit is required to maintain vacuum states between the rotatable part of the rotor which is maintained at the cryogenic temperature and the non-rotatable part of the rotor. In this case, the amounts of thermal contraction of the rotating and non-rotating parts of the coolant supplying/receiving unit 20 are different from each other due to a temperature difference between them, which may cause the rotor to be vibrated when it is rotated. Moreover, joints of the rotatable and non-rotatable parts of the rotor may be not reliable when the rotor is operated for a long time while being maintained in the high vacuum state and at the cryogenic temperature.

SUMMARY OF THE INVENTION

Therefore, the present invention has been made in view of the above problems, and it is an object of the present invention to provide a superconducting rotor with a cooling system, which is adapted for accomplishing field coil in superconducting state even without a coolant supplying/receiving unit having a complicated structure, and for reliably maintaining high vacuum at desired regions of the rotor, and a superconducting generator and a superconducting motor using such a superconducting rotor.

It is another object of the present invention to provide a superconducting rotor with a cooling system, which comprises a pulse tube refrigerator having no mechanical moving parts, such as a piston of a G-M type (Gifford-McMahon type) refrigerator or a Stirling type refrigerator, the pulse tube refrigerator being constructed integrally with the field coil to perform a conduction cooling function, wherein a coolant having cryogenic temperature does not flow inside the rotor, whereby its thermal insulating efficiency is greatly increased. Therefore, its operation is possible at any temperature regardless of evaporation temperature of the coolant, and thus its reliability is improved even when it is operated for a long time, and a superconducting generator and a superconducting motor using such a superconducting rotor.

In accordance with one aspect of the present invention, the above and other objects can be accomplished by the provision of a superconducting rotor with a cooling system, comprising: a superconducting field coil; and cooling means for cooling the superconducting field coil by a low temperature (cold finger) end formed by means of heat flow generated by repeated compression and expansion of a working fluid.

In accordance with another aspect of the present invention, there is provided a superconducting rotor with a cooling system, comprising: a superconducting field coil excited by an external power source for generating a strong magnetic field; a field coil supporting member for supporting the superconducting field coil; a coaxial type pulse tube refrigerator comprising: an annular-shaped regenerating tube disposed inside the field coil supporting member and connected to a low temperature end connection part; a pulse tube disposed inside the regenerating tube and connected to the regenerating tube; a high temperature end connection part connected between the regenerating tube and the pulse tube; a working fluid flowing tube disposed at the high temperature end of the regenerating tube for allowing a high pressure gas to flow into the regenerating tube and a low pressure gas to flow out of the regenerating tube; a double gas inlet valve connected between the working fluid flowing tube and the pulse tube at the high temperature end connection part; and a gas buffer tank connected to the pulse tube at the high temperature end connection part via an orifice valve; a torque tube connected to the field coil supporting member being rotated by means of the strong magnetic field generated by the field coil; and working fluid supplying devices for alternately supplying a high pressure working fluid and a low pressure working fluid to the working fluid flowing tube.

Preferably, the working fluid supplying devices comprises: a rotary sealing unit connected to the working fluid flowing tube; a compressor for compressing the working fluid; and a rotary valve for alternately supplying the high and the low pressure working fluid from the compressor to the working fluid flowing tube via the rotary sealing unit.

Alternatively, the working fluid supplying devices comprises a linear compressor rotating along with the torque tube for repeatedly compressing and expanding the working fluid.

In accordance with yet another aspect of the present invention, there is provided a superconducting generator comprising: a superconducting rotor as mentioned above; an armature disposed around the superconducting rotor while being spaced apart from the superconducting rotor, wherein an electric current is induced at the armature by means of the rotary magnetic field generated at the field coil of the superconducting rotor.

In accordance with yet another aspect of the present invention, there is provided a superconducting motor comprising: a superconducting rotor as mentioned above; and an armature disposed around the superconducting rotor while being spaced apart from the superconducting rotor, wherein the superconducting rotor is rotated by means of the rotary magnetic field generated by the armature coil of the superconducting motor as an electric current is applied to the armature so that the rotating force is transmitted to the outside.

According to the present invention with the above-stated construction, the pulse tube refrigerator installed inside the field coil is operated to cool the field coil to an operating temperature by a conduction cooling mechanism so that the field coil is maintained at a superconducting state. Consequently, the rotor can be operated even without circulation of a liquefied or gaseous coolant at cryogenic temperature, its structure becomes very simple, and its operational convenience, efficiency, and reliability are greatly improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
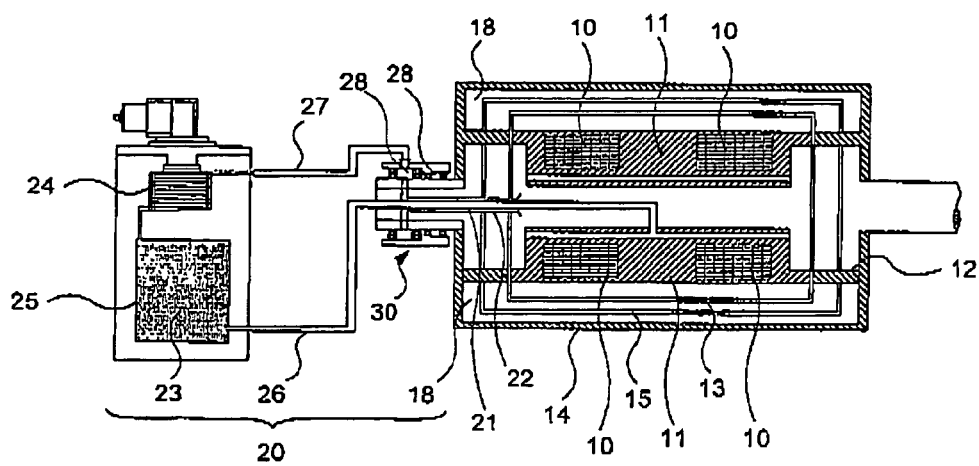
FIG. 1 shows a conventional superconducting rotor.
Figure 2:
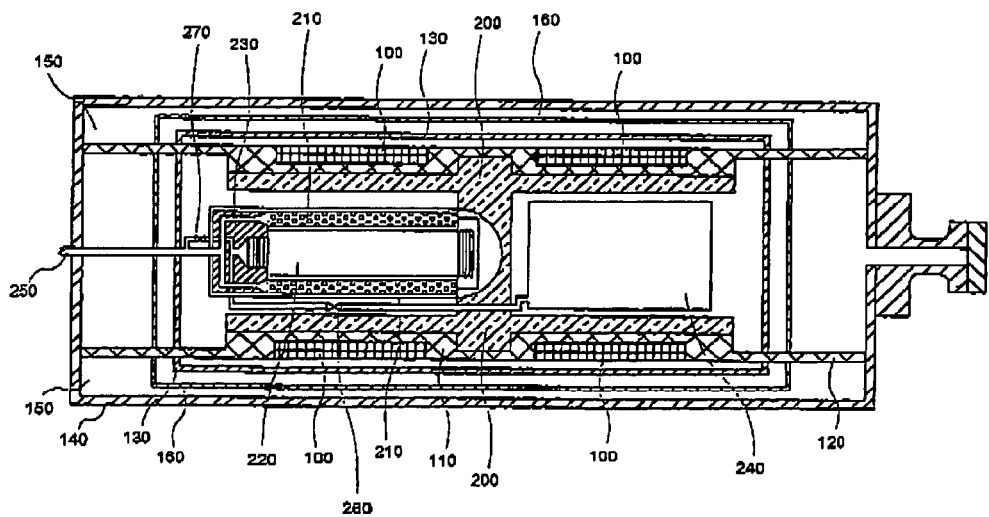
FIG. 2 is a longitudinal sectional view of principal parts of a superconducting rotor with a cooling system according to the present invention.

FIG. 2 is a longitudinal sectional view of principal parts of a superconducting rotor with a cooling system according to the present invention.

As shown in FIG. 2, a superconducting field coil 100 made of a superconducting wire for generating a strong magnetic field is supported by a field coil supporting member 110. The superconducting field coil 100 is preferably made of an oxide-based superconducting wire. Inside the field coil supporting member 110 is disposed a pulse tube refrigerator for cooling the field coil 100. The pulse tube refrigerator is connected to a low temperature end connection part 200.

The coaxial type pulse tube refrigerator comprises: an annular-shaped regenerating tube with the regenerator 210; a pulse tube 220 disposed inside the regenerating tube 210; a high temperature end connection part 230 connected between the regenerating tube 210 and the pulse tube 220; a working fluid flowing tube 250 disposed at the high temperature end of the regenerating tube 210 for allowing a high pressure gas to flow into the regenerating tube 210 and a low pressure gas to flow out of the regenerating tube 210; a double gas inlet valve 270 connected between the working fluid flowing tube 250 and the pulse tube 220 at the high temperature end connection part 230; and a gas buffer tank 240 connected to the pulse tube 220 and the double gas inlet valve 270 at the high temperature end connection part 230 via an orifice valve 260.

The regenerating tube 210 is filled with porous material having thermal capacity larger than that of the working fluid. The regenerating tube 210 preserves cooling temperature created in the pulse tube 220, and serves as a thermal sponge for cooling or heating the working fluid when the working fluid flows through the regenerating tube 210.

In the pulse tube 220, a high pressure working gas is moved by a gas piston, as in a solid expander of a general refrigerator, to cool the low temperature end connection part 200 so that the field coil is cooled. The regenerating tube 210 preserves cooling temperature created in the pulse tube 220, and cools or heats the working fluid when the working fluid flows through the regenerating tube 210. The double gas inlet valve 270, the orifice valve 260, and the gas buffer tank 240 together adjust a phase shift between the gas pressure and the mass flow rate in the pulse tube 220 to increase its cooling efficiency.

At both ends of the field coil supporting member 110 are integrally formed torque tubes 120 for transmitting a rotating force generated by means of a strong magnetic field of the field coil 100 to the outside. Around the field coil supporting member 110 is disposed a inner rotor cylinder 130 for enclosing at least the field coil supporting member 110 including the field coil 100. Around the inner rotor cylinder is disposed an outer rotor cylinder 140 for enclosing the inner rotor cylinder 130 and the torque tube 120. Between the inner rotor cylinder 130 and the outer rotor cylinder 140 is defined a vacuum section 150 formed with a high vacuum for minimizing an inflow of heat from the outside. In the vacuum section 150 is mounted a thermal radiation shield 160 for preventing inflow of radiant heat from the outside. Around the thermal radiation shield 160 are disposed multi-layered superinsulations (not shown) for minimizing heat transfer by radiation. At the outer rotor cylinder 140 is formed a vacuum port (not shown) for performing vacuum ventilation.

With the construction as described above, a part of a bobbin of the field coil 100 constitutes the pulse tube refrigerator. Consequently, it is possible to cool the superconducting coil. Such a pulse tube refrigerator was introduced by W. E. Gifford and R. C. Longsworth in 1963. The pulse tube refrigerator is characterized in that it has a single tube, by which a low temperature end operating section (an expander) of a Stirling type refrigerator is replaced, that it has an actuating system using a gas piston instead of a solid piston, and that a low temperature section is formed at a compressor part in case of the in-line pulse tube refrigerator while a high temperature section is formed at the opposite part to the compressor part by means of heat exchange between the tube and a gas, thereby increasing its cooling efficiency. The low temperature moving section is eliminated from the pulse tube refrigerator. Consequently, vibration of the pulse tube refrigerator is greatly decreased, the cost of manufacturing the pulse tube refrigerator is reduced, its reliability and service life are increased, and its design flexibility is highly improved.

Figure 3:
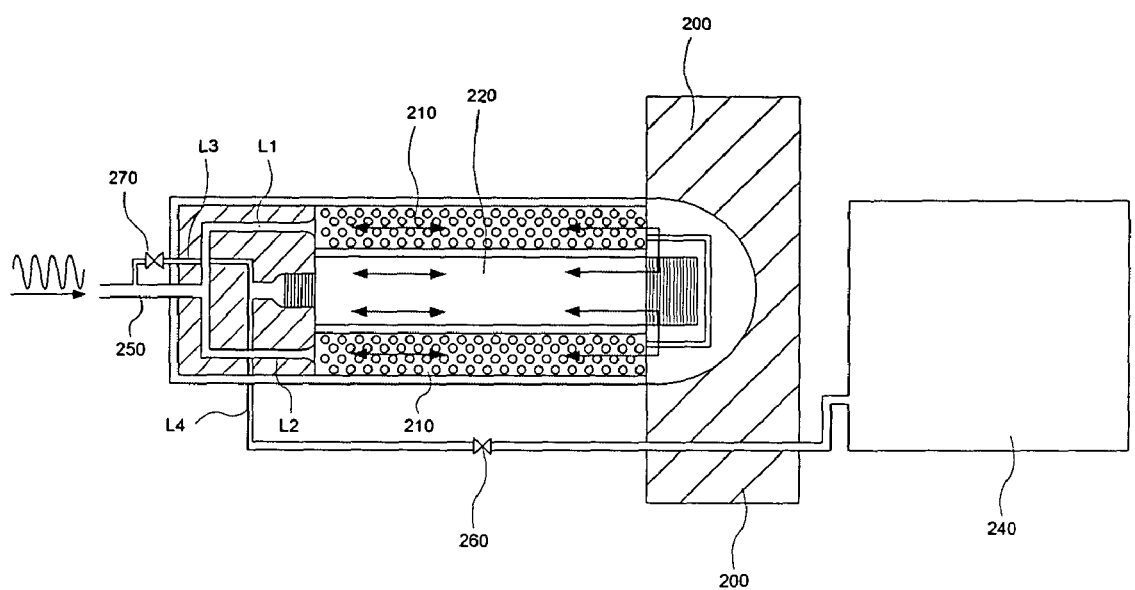
FIG. 3 is an enlarged view of a pulse tube refrigerator of the superconducting rotor with the cooling system of FIG. 2.

The pulse tube refrigerator adopted by the present invention will now be described in more detail with reference to FIG. 3.

As the working gas flowing through the working fluid flowing tube 250, for example, a helium gas is periodically and repeatedly compressed and expanded, periodic pressure changes of the helium gas are transmitted from the high temperature end to the low temperature end via tubes L1 and L2, and the regenerating tube 210. In other words, a pressure wave is generated in the pulse tube 220, and a phase shift between the pressure wave and mass flow rate is properly adjusted by appropriately controlling the orifice valve 260 and double gas inlet valve 260 connected to the high temperature end of the pulse tube 220, to form a gas piston serving as an expander, which corresponds to a piston/displacer of G-M type (Gifford-McMahon type) and Stirling type refrigerator, in the pulse tube 220. As a result, enthalpy flows from the low temperature end to the high temperature end of the pulse tube 220 to cool the low temperature end connection part 200 at the low temperature end of the pulse tube 220. Consequently, the field coil 100, which is connected to the low temperature end connection part 200 via the field coil supporting member 110, is also cooled.

It should be noted that the volume of the gas buffer tank 240 must be larger than that of the pulse tube 220 to maintain a constant pressure of the interior of the gas buffer tank 240.

The orifice valve 260 basically serves to control phases shifts between of the pressure and the mass flow rate of the helium gas flowing from the compressor to the gas buffer tank 240 and from the gas buffer tank 240 to the compressor. The phases shifts between the pressure and the mass flow rate of the helium gas flowing from the compressor to the gas buffer tank 240 and from the gas buffer tank 240 to the compressor are critical to performance of the refrigerator, and they are sensitively changeable. For this reason, a degree of opening of the orifice valve 260 must be optimized by experiments after manufacturing the pulse tube refrigerator.

The double gas inlet valve 270 overcomes the limit of any phase difference caused by the orifice valve 260, and eliminates loss incurred from excessive helium gas passing through the regenerating tube 210, whereby the efficiency and cooling performance of the rotor is improved. The performance of the double gas inlet valve 270 is also sensitively changeable depending upon a degree of opening of the valve. Consequently, the degree of opening of the double gas inlet valve 270 must be optimized by experiments after manufacturing the pulse tube refrigerator.

It should be noted that diameters and lengths of the working fluid flowing tube 250, the tubes L1 and L2 connected between the working fluid flowing tube 250 and the regenerating tube 210, a tube L3 connected between the double gas inlet valve 270 and the pulse tube 220, a tube L4 connected between the pulse tube 220 and the orifice valve 260, and a tube L5 connected between the orifice valve 260 and the gas buffer tank 240 must be changeable depending upon the capability (cooling capacity) of the pulse tube refrigerator. If the diameters of the working fluid flowing tube 250, and the tubes L1 and L5 are too large, the dead volume, which is the volume not contributing to the cooling operation, of the pulse tube refrigerator is increased, whereby the cooling efficiency is decreased. If the diameters of the working fluid flowing tube 250, and the tubes L1 and L5 are too small, flow channel resistance is increased, which leads to increased compression and expansion rate, whereby the cooling efficiency is also decreased. Also, the mass flow rate of the refrigerator is determined on the basis of the capability (cooling capacity) of the refrigerator. Consequently, the diameters and lengths of the tubes must be determined on the basis of the mass flow rate of the refrigerator.

Also, the diameter and length of the pulse tube 220, the diameter and length of the regenerating tube 210, the number of meshes made of porous materials of the regenerating tube 210, the volume of the gas sbuffer tank 240, the flow coefficient of the double gas inlet valve 270, and the flow coefficient of the orifice valve 260 must be differently determined depending upon the capability (cooling capacity) of the pulse tube refrigerator.

The working fluid flowing tube 250, and the tubes L1 and L5 are fundamentally parts of the dead volume, and the flow coefficients of the double gas inlet valve 270 and the orifice valve 260 are critical operating variables. Consequently, the degree of opening (flow coefficient) of each of the valves 270 and 260 must be determined to an appropriate value.

Figure 4:
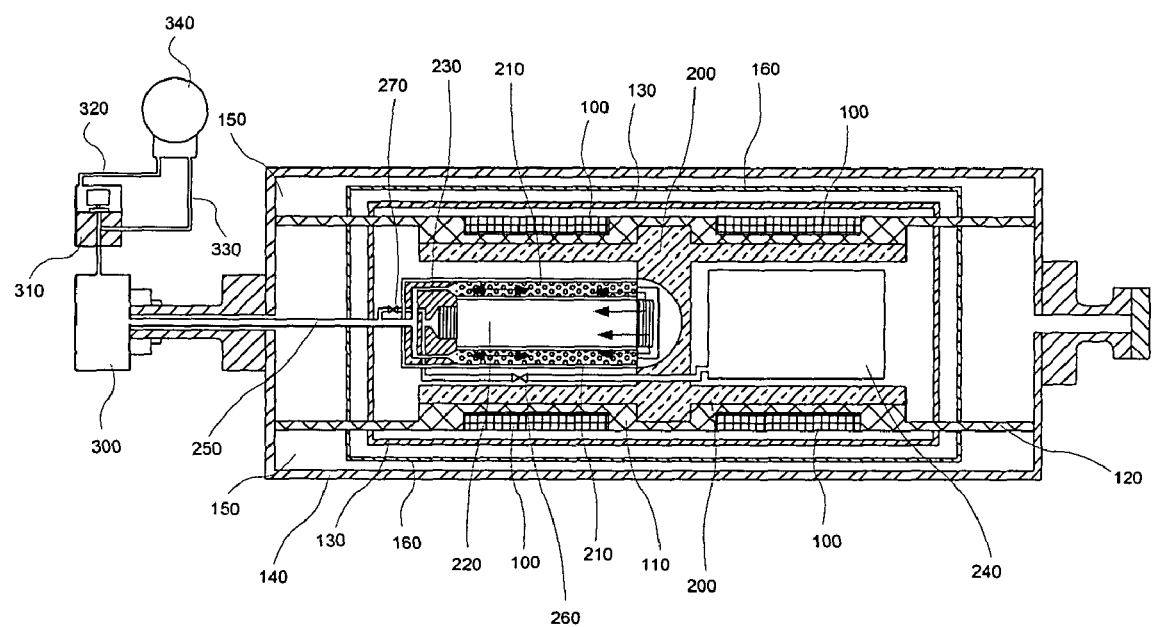
FIG. 4 shows a superconducting rotor with a cooling system according to a preferred embodiment of the present invention.

FIG. 4 is a longitudinal sectional view of a superconducting rotor with a cooling system according to a preferred embodiment of the present invention.

As shown in FIG. 4, the working fluid flowing tube 250 is connected to a rotary valve 310 via the rotatable sealing unit 300 while air-tightness of the working fluid flowing tube 250 is maintained at room temperature, not an cryogenic temperature. To the rotary valve 310 is connected a high pressure gas introducing tube 320, through which a high pressure gas is introduced to a working fluid compressor 340. To the rotary valve 310 is also connected a low pressure gas discharging tube 330, through which a low temperature gas is discharged into the working fluid compressor 340. The working fluid compressor 340 may be a helium gas compressor using a helium gas as the working fluid.

As the high pressure gas introducing tube 320 and the low pressure gas discharging tube 330 of the working fluid compressor 340 are alternately connected to the working fluid flowing tube 250 via the rotary valve 310, a pressure wave is transmitted into the pulse tube 220 via the regenerating tube 210. A phase shift between the pressure wave and mass flow rate in the pulse tube is properly adjusted by appropriately controlling the degree of opening of the orifice valve 260 and the double gas inlet valve 270, to form a gas piston serving as an expander, which corresponds to a piston/displacer of G-M type (Gifford-McMahon type) and Stirling type refrigerator, in the pulse tube 220. As a result, enthalpy flows from the low temperature end to the high temperature end of the pulse tube 220 to cool the low temperature end connection part 200 at the low temperature end of the pulse tube 220. Consequently, the field coil 100, which is connected to the low temperature end connection part 200 via the field coil supporting member 110, is also cooled.

In other words, the high pressure gas introducing tube 320 and the low pressure gas discharging tube 330 of the external working fluid compressor 340 are connected to the working fluid flowing tube 250 via the rotary valve 310, and the working fluid is moved into or out of the pulse tube 220 by the rotary valve 310. Enthalpy flow is performed between the low temperature end and the high temperature end to cool the low temperature end. Consequently, the field coil 100 is cooled at the operating temperature of 25 to 30 Kelvin so that the field coil 100 is maintained at a superconducting state. According to the present invention, the low temperature end of the pulse tube refrigerator having no movable parts corresponding to the piston or the displacer of the conventional art is disposed inside the field coil 100 so that the low temperature end of the pulse tube refrigerator is cooled in a conduction cooling mechanism. Consequently, it is possible to cool the field coil up to a certain operating temperature from a room temperature without inflow and outflow of a coolant to operate the rotor.

In this embodiment, the rotary sealing unit 300, which is rotatable while being maintained airtight at the high pressure, is connected to the end of the working fluid flowing tube 250, and the rotary valve 310, which is connected to the rotary sealing unit 300 for supplying and discharging the working fluid of the high pressure at a pulse tube refrigerator operating frequency, is disposed between the rotary sealing unit 300 and the working fluid compressor 340. Consequently, the high pressure working fluid serves as the gas piston in the pulse tube 220 to cool the low temperature end. According to the present invention, the cooling cycle part of the pulse tube refrigerator capable of forming a cooling cycle without mechanical moving parts corresponding to the piston of the conventional art is disposed inside the field coil 100, and the compressor 340 is installed outside the rotatable part of the rotor. Consequently, it is possible to realize a superconducting rotor having its own cooling capability. Moreover, the structure of the rotor is simplified, the cooling efficiency of the rotor is greatly increased, and the reliability of the rotor is improved.

Figure 5:
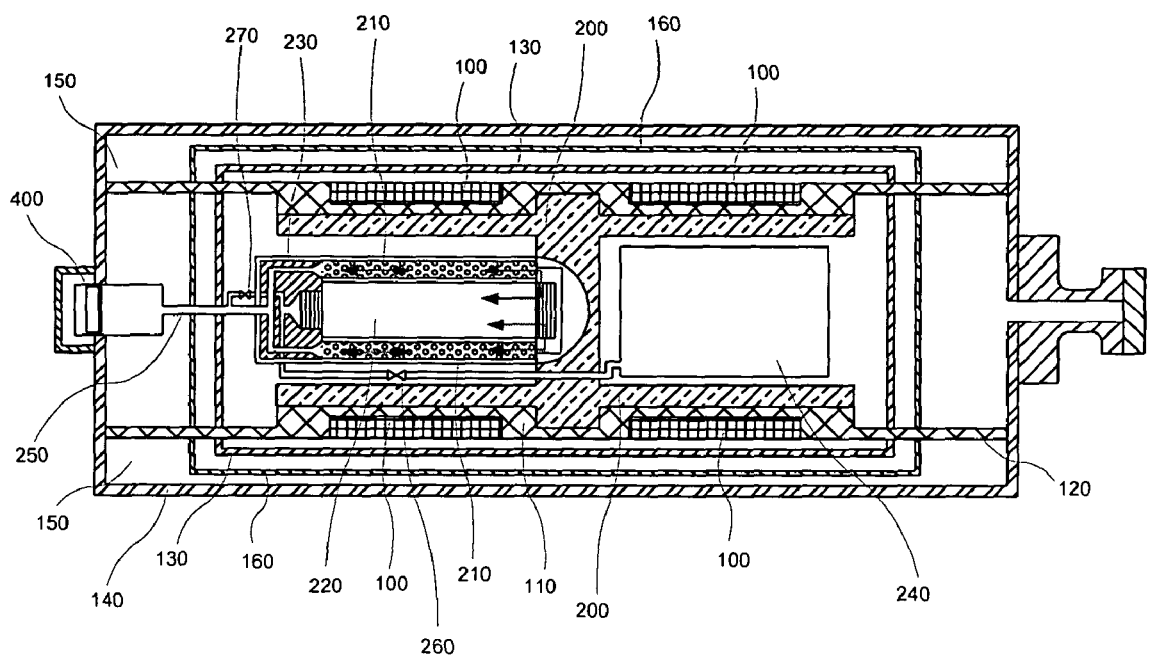
FIG. 5 shows a superconducting rotor with a cooling system according to another preferred embodiment of the present invention.

FIG. 5 is a longitudinal sectional view of a superconducting rotor with a cooling system according to another preferred embodiment of the present invention.

As shown in FIG. 5, to the end of the working fluid flowing tube 250 is directly attached to a linear compressor 400, which is capable of linearly moving, by which the low temperature end of the pulse tube 220 is cooled. In this case, the linear compressor 400 can be rotated together with the superconducting rotor.

As the superconducting rotor is rotated, the linear compressor 400 securely attached to rotor is also rotated so that the working fluid in the working fluid flowing tube 250 is alternately compressed and expanded. As a result, periodic pressure changes of the working gas are transmitted from the low temperature end to the high temperature end of the pulse tube 220 via the regenerating tube 210, and enthalpy flows from the low temperature end to the high temperature end of the pulse tube 220 to cool the low temperature end connection part 200 at the low temperature end of the pulse tube 220. Consequently, the field coil 100, which is connected to the low temperature end connection part 200 via the field coil supporting member 110, is also cooled.

The embodiment of FIG. 5 eliminates the rotary sealing unit and the rotary valve necessary for connecting to the external compressor as in the previously described embodiment of FIG. 4. Consequently, it is possible to realize the superconducting rotor capable of operating the pulse tube refrigerator and cooling the superconducting coil with the more simplified structure thereof.

In the aforesaid embodiments of the present invention, only the superconducting rotor with the cooling system has been described. It is to be understood, however, that a superconducting generator is realized from the construction in which electric current is generated at an armature wound around the outer rotor cylinder while being spaced apart from the outer rotor cylinder by means of the rotary magnetic field. Otherwise, a superconducting motor is also realized from the construction in which an electric current is applied to the armature to rotate the superconducting field coil.

As apparent from the abovedescription, the present invention provides a superconducting rotor with a cooling system, which is adapted for accomplishing field coil in superconducting state even without a coolant supplying/receiving unit having a complicated structure, and for reliably maintaining high vacuum at desired regions of the rotor, thereby improving its reliability. Furthermore, a low temperature end of a pulse tube refrigerator having no mechanical moving parts is directly connected to a field coil supporting member to perform a conduction cooling function so that the superconducting field coil is cooled down to a certain operating temperature. Moreover, a secondary cryogenic temperature coolant or heat transfer medium is not provided between the low temperature end of the pulse tube refrigerator and the rotatable superconducting field coil, whereby its thermal insulating structure and its vacuum structure are simplified, its cooling efficiency is greatly increased, and thus efficiency and reliability of the entire system are improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A superconducting rotor with a cooling system located inside, comprising:
    a superconducting field coil; and
    cooling means for cooling the superconducting field coil by means of heat and enthalpy flow generated by repeated compression and expansion of a working fluid;
    wherein said cooling means comprises a pulse tube refrigerator having a gas piston.

2. The rotor as set forth in claim 1, wherein the working fluid is helium gas.

3. A superconducting rotor with a cooling system located inside, comprising:
    a superconducting field coil excited by an external power source for generating a strong magnetic field;
    a field coil supporting member for supporting the superconducting field coil;
    a pulse tube refrigerator comprising: an annular-shaped regenerating tube disposed inside the field coil supporting member and connected to a low temperature end connection part; a pulse tube disposed inside the regenerating tube and connected to the regenerating tube; a high temperature end connection part connected between the regenerating tube and the pulse tube; a working fluid flowing tube disposed at the high temperature end of the regenerating tube for allowing a high pressure gas to flow into the regenerating tube and a low pressure gas to flow out of the regenerating tube; a double gas inlet valve connected between the working fluid flowing tube and the pulse tube at the high temperature end connection part; and a gas buffer tank connected to the pulse tube at the high temperature end connection part via an orifice valve;
    a torque tube connected to the field coil supporting member, and rotated by means of the strong magnetic field generated by the field coil; and
    working fluid supplying means for alternately supplying a high pressure working fluid and a low pressure working fluid to the working fluid flowing tube.

4. The rotor as set forth in claim 3, further comprising:
    an inner rotor cylinder for enclosing at least the field coil supporting member including the superconducting field coil;
    an outer rotor cylinder for enclosing the inner rotor cylinder; and
    a thermal radiation shield mounted between the inner rotor cylinder and the outer rotor cylinder.

5. The rotor as set forth in claim 3, wherein the working fluid supplying means comprises:
    a rotary sealing unit connected to the working fluid flowing tube;
    a compressor for compressing the working fluid; and
    a rotary valve for alternately supplying the high pressure working fluid and the low pressure working fluid from the compressor to the working fluid flowing tube via the rotary sealing unit.

6. The rotor as set forth in claim 3, wherein the working fluid supplying means comprises a linear compressor rotated along with the torque tube for repeatedly compressing and expanding the working fluid in the working fluid flowing tube.

7. The rotor as set forth in claims 3, wherein the working fluid is helium gas.

8. A superconducting generator, comprising:
    a superconducting rotor including
    a superconducting field coil, and
    cooling means for cooling the superconducting field coil by means of heat and enthalpy flow generated by repeated compression and expansion of a working fluid; and
    an armature disposed around the superconducting rotor while being spaced apart from the superconducting rotor,
    wherein the magnetic field generated at the field coil is rotated as the superconducting rotor is rotated so that an electric current is induced at the armature;
    wherein said cooling means comprises a pulse tube refrigerator having a gas piston.

9. A superconducting generator, comprising:
    a superconducting rotor including
    a superconducting field coil excited by an external power source for generating a strong magnetic field,
    a field coil supporting member for supporting the superconducting field coil,
    a pulse tube refrigerator consisting of an annular-shaped regenerating tube disposed inside the field coil supporting member and connected to a low temperature end connection part, a pulse tube disposed inside the regenerating tube and connected to the regenerating tube, a high temperature end connection part connected between the regenerating tube and the pulse tube, a working fluid flowing tube disposed at the high temperature end of the regenerating tube for allowing a high pressure gas to flow into the regenerating tube and a low pressure gas to flow out of the regenerating tube, a double gas inlet valve connected between the working fluid flowing tube and the pulse tube at the high temperature end connection part, and a gas buffer tank connected to the pulse tube at the high temperature end connection part via an orifice valve,
    a torque tube connected to the field coil supporting member, and rotated by means of the strong magnetic field generated by the field coil, and
    working fluid supplying means for alternately supplying a high pressure working fluid and a low pressure working fluid to the working fluid flowing tube; and
    an armature disposed around the superconducting rotor while being spaced apart from the superconducting rotor,
    wherein the magnetic field generated at the field coil is rotated as the superconducting rotor is rotated so that an electric current is induced at the armature.

10. A superconducting motor, comprising:
    a superconducting rotor including
    a superconducting field coil, and cooling means for cooling the superconducting field coil by means of heat and enthalpy flow generated by repeated compression and expansion of a working fluid; and
an armature disposed around the superconducting rotor while being spaced apart from the superconducting rotor,
wherein the superconducting rotor is rotated by means of the magnetic field generated at the field coil of the superconducting rotor as an electric current is applied to the armature so that the rotating force is transmitted to the outside;
wherein said cooling means comprises a pulse tube refrigerator having a gas piston.

11. A superconducting motor, comprising:
a superconducting rotor including
a superconducting field coil excited by an external power source for generating a strong magnetic field,
a field coil supporting member for supporting the superconducting field coil,
a pulse tube refrigerator consisting of an annular-shaped regenerating tube disposed inside the field coil supporting member and connected to a low temperature end connection part, a pulse tube disposed inside the regenerating tube and connected to the regenerating tube, a high temperature end connection part connected between the regenerating tube and the pulse tube, a working fluid flowing tube disposed at the high temperature end of the regenerating tube for allowing a high pressure gas to flow into the regenerating tube and a low pressure gas to flow out of the regenerating tube, a double gas inlet valve connected between the working fluid flowing tube and the pulse tube at the high temperature end connection part, and a gas buffer tank connected to the pulse tube at the high temperature end connection part via an orifice valve,
a torque tube connected to the field coil supporting member, and rotated by means of the strong magnetic field generated by the field coil, and
working fluid supplying means for alternately supplying a high pressure working fluid and a low pressure working fluid to the working fluid flowing tube; and
an armature disposed around the superconducting rotor while being spaced apart from the superconducting rotor,
wherein the superconducting rotor is rotated by means of the magnetic field generated at the field coil of the superconducting rotor as an electric current is applied to the armature so that the rotating force is transmitted to the outside.

* * * * *